Oct. 31, 1950   R. A. WELCH   2,527,866
ENDGATE CONSTRUCTION
Filed April 8, 1946   2 Sheets-Sheet 1
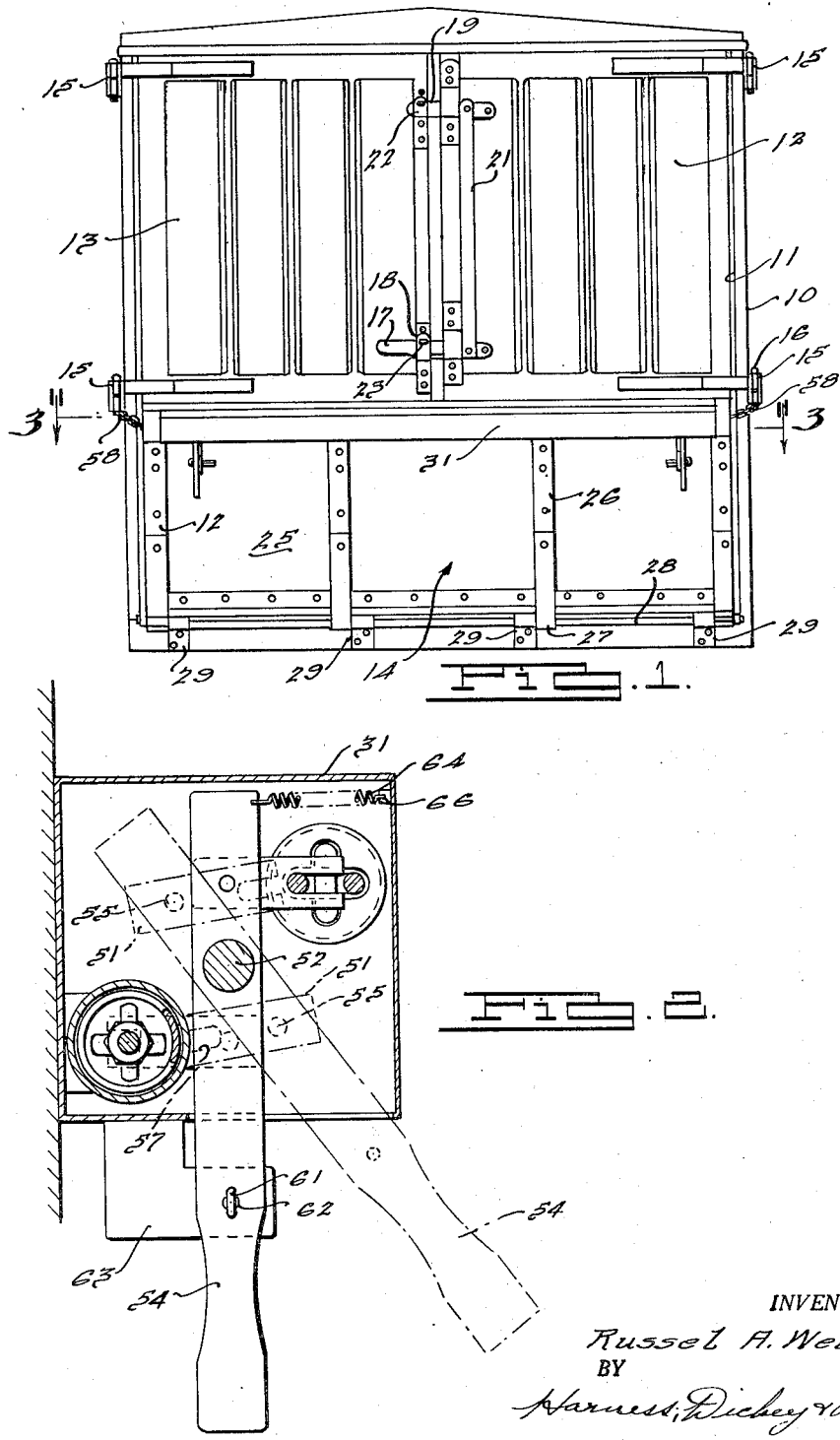
INVENTOR.
Russel A. Welch.
BY
Harness, Dickey & Pierce
ATTORNEYS.

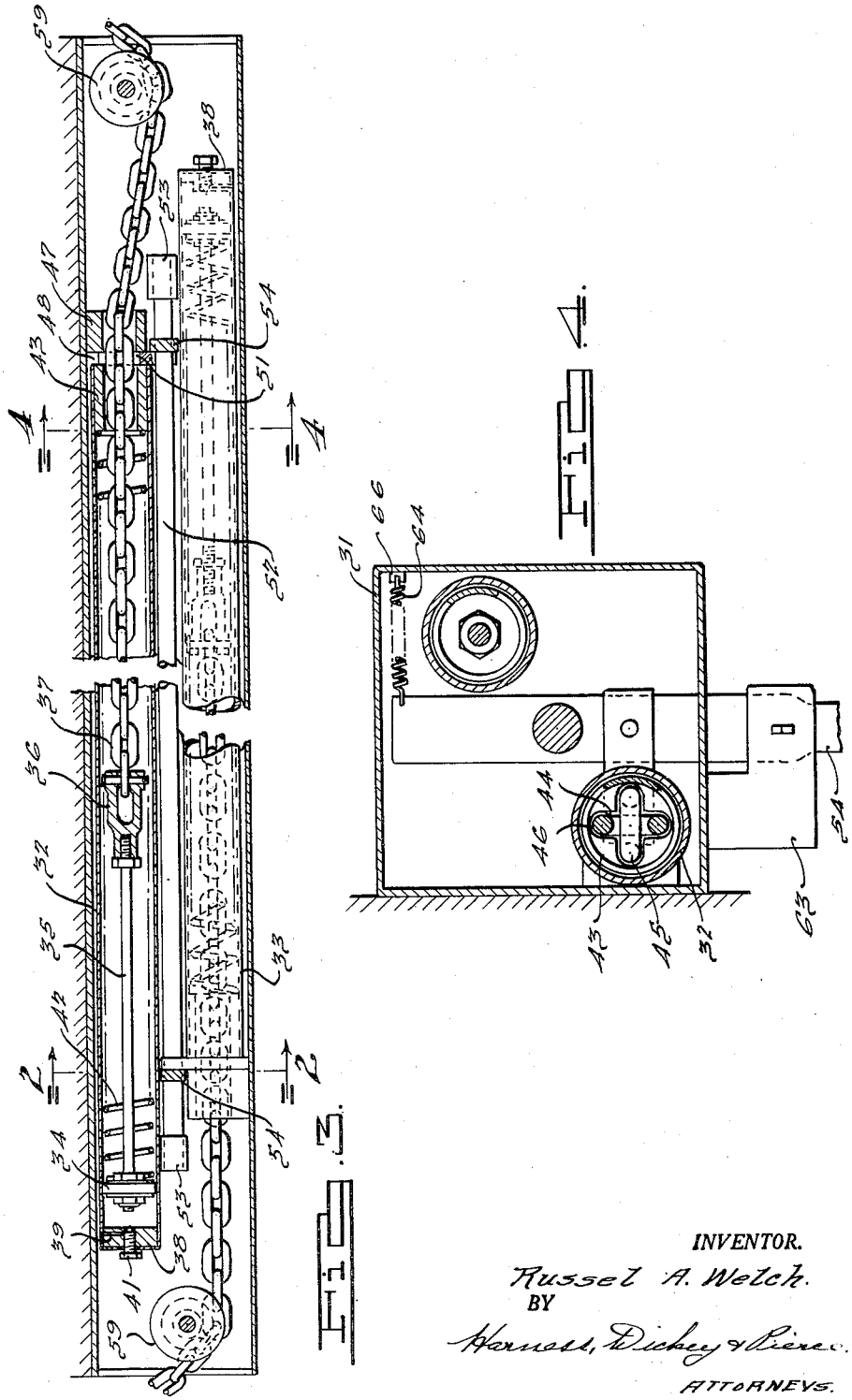

Patented Oct. 31, 1950

2,527,866

UNITED STATES PATENT OFFICE 2,527,866

ENDGATE CONSTRUCTION

Russel A. Welch, Detroit, Mich.

Application April 8, 1946, Serial No. 660,540

12 Claims. (Cl. 296—57)

This invention relates to endgate constructions, and particularly to an endgate having means thereon for balancing its weight.

The endgate of the present invention is one employed upon large trailer and truck bodies, having its lower edge hinged along the bottom of the body to cooperate with two doors which are hinged to the body sides and disposed thereabove. The endgate is reinforced by a box-section structure along the top edge in which a pair of spring balancing mechanisms is mounted having chains extending from opposite sides of the endgate which are secured to the side edges of the body. The springs of the mechanisms are of a size to provide a tension to balance the weight of the endgate as it swings outwardly and downwardly or when being lifted by the operator into vertical position.

Locking handles are mounted on the endgate having portions extending within the box-section structure and so disposed as to engage the chains to thereby retain the endgate in vertical or in any angular position depending upon the position of the endgate when the locking means engages the chains. An aperture is provided through the operating handle and through a bracket upon the endgate to which the hasp of a padlock is insertable for locking the handle, and therefore the endgate, in closed or in a desirable angular position.

Accordingly, the main objects of the invention are: to provide an endgate with counterbalancing means which retards the opening and assists in the closing operation thereof; to provide a horizontal shaft upon which an endgate swings outwardly and downwardly on the end of a vehicle body having at the top edge a box-section construction in which spring operated counterbalancing mechanism is provided for reducing the effort required to operate the endgate; to provide counterbalancing devices in a box-section construction at the top edge of an endgate having chains secured to the sides of the body which are engaged by an operating mechanism to lock the endgate in its adjusted position; and, in general, to provide a counterbalancing device for an endgate which is hidden from view and which is simple in construction and positive in operation.

Other objects and features of novelty of the invention will be specifically pointed out or will become apparent when referring, for a better understanding of the invention, to the following description taken in conjunction with the accompanying drawings, wherein:

Figure 1 is a view in elevation of the rear end of a vehicle body having a horizontally hinged endgate embodying features of this invention;

Fig. 2 is an enlarged sectional view of the structure illustrated in Fig. 3, taken on the line 2—2 thereof;

Fig. 3 is an enlarged sectional view of the structure illustrated in Fig. 1, taken on the line 3—3 thereof; and Fig. 4 is an enlarged sectional view of the structure illustrated in Fig. 3, taken on the line 4—4 thereof.

In the figures, the vehicle body 10 has an open end 11, closed by a pair of upper doors 12 and 13 and a lower endgate 14. The upper doors are provided with hinges 15 having vertically disposed pintles 16. A locking handle 17, pivoted on the door 12, engages a locking bracket 18 on the opposite door and operates a locking arm 19 through the connecting link 21 into and out of engagement with a locking bracket 22. The brackets 18 and 22 are provided with an aperture 23 through which the hasp of the lock may be inserted for locking the doors 12 and 13 in closed position. When the lock is removed the handle 17 may be raised to disengage it and the link 21 from the locking brackets 18 and 22, respectively, and permit the doors to swing outwardly to a position along the outside of the body 10.

The endgate 14 embodies a panel 25 having reinforcing elements 26 thereon which are reversely bent to form eyes 27 which pivotally engage a rod 28 supported in brackets 29 secured to the bottom edge of the body 10. The panel 25 is reinforced at the top by a longitudinally extending box-section element 31 which is open at both of its ends and which has a pair of oppositely presenting longitudinally disposed cylinders 32 and 33 secured in fixed position therewithin. Each of the cylinders 32 and 33 has a piston 34 mounted therein on a rod 35 to the end of which a clevis 36 is secured. The cylinder 32, as viewed in Fig. 3, has its open end directed toward the right while that of the cylinder 33 is directed toward the left. A pair of chains 37 is employed, secured to the clevises 36, the end of each chain extending from the cylinders 32 and 33 and from opposite ends of the box-section structure 31.

Each of the closed ends 38 of the cylinders 32 and 33 contains a piston 34 with a passageway 39 communicating with the atmosphere, the area of which is regulated by a screw 41 for controlling the rate of flow of air therethrough. A compression spring 42 is disposed within each of the cylinders 32 and 33 one end of which engages the forward area of the piston 34, the opposite end of which engages guide blocks 43 enclosing the opposite ends of the cylinders. The guide blocks 43 have cross-shaped openings 44 therethrough for guiding the links 45 and 46 of the chain which are disposed in right-angle relation to each other, as illustrated in Fig. 4. Similar guide blocks 47 are mounted in the box-section structure 31 beyond the ends of the cylinders 32 and 33 to provide a space 48 therebetween. The guide block 47 is provided with a cross-shaped opening 44 disposed in alignment with that in the guide blocks 43. The links of the chain are retained in predetermined position as they pass from the opening 44 in the guide block 43, into opening 44 in the guide block 47 to permit slotted locking plates 51 to project over a link 45 between the links 46 in engagement therewith.

A shaft 52 is journaled on the central line of the box-section structure 31 on bearings 53. The shaft has operating handles 54 secured thereto to which the locking plates 51 are attached, herein illustrated as by pivots 55. The plates 51 are so located on the shaft 52 as to be aligned with the space 48 between the guide blocks 43 and 47 and are operated therein when the handles 54 are actuated. The element 31 of box-section construction is provided with slots 50 in the bottom wall through which the handles 54 project, as illustrated in Fig. 3. The endgate is adjusted to have the links 45 disposed in the center of the spaces 48 to permit the slots 57 in the plates 51 to slide over the links 45 and thereby lock the endgate against movement.

The ends of the chains project from the opposite end of the box-section structure 31 and are permanently secured to brackets 58 at the side of the body 10 adjacent to the ends of the box-section structure. Pulleys 59 may be mounted adjacent to the end openings in the box-section structure 31, or the top plate of the structure may be utilized, over which the chains are guided as the endgate is moved to and from closed position. When the endgate is to be opened, one or both of the handles 54 are moved outwardly to rotate the shaft 52 in a counterclockwise direction for withdrawing the plates 51 from engagement with the links 45 of the chains 37. The endgate 14 is then free to be moved outwardly and downwardly about the rod 28, which movement is counterbalanced by the tension of the springs 42 and the reduced pressure provided between the piston 34 and the cylinder end 38 as it moves therefrom, the amount of which is controlled by the setting of the screw 41 to regulate the size of the passageway 39. The endgate may be locked in horizontal or in angular position by manipulating the handle 54 inwardly toward the plate 23 to thereby have the slots 57 in the locking plates 51 register with the links 45 of the chains to secure the endgate in its adjusted position. In either the raising or lowering operation of the endgate, the weight thereof is counterbalanced by the two counterbalancing devices retained within the box-section structure 31. When the endgate is moved to closed position, the air between the piston 34 and cylinder end 38 will be compressed near the end of the movement, which pressure could be relieved by a relief valve employed in the piston although it was found that after the endgate was raised no substantial force was required to move it to closed position without the aid of the counterbalancing mechanism. After the endgate is closed, it is locked in position by the projection of the portion of the plates 51 each side of the slots 57 over the links 45 in the spaces 48.

Each of the handles 54 is provided with an opening 61 which is aligned with an opening 62 in a bracket 63 which is welded to the bottom portion of the box-section element 31. The hasp of a lock is insertable through the apertures 61 and 62 when the handle is manipulated to lock the endgate in a desired position which prevents unauthorized shifting of the endgate. A spring 64 may be connected between a projecting boss 65 in the box-section structure 31 and the aperture in one of the operating handles 54 to urge the handles toward locking position.

When the endgate is to be lowered, one or both of the handles are pulled outwardly to unlock the plates 51 from the chains 37 and held outwardly against the tension of the spring 64 during the lowering operation. When lowered, the spring returns the handles to locking position with the plates 51 in engagement with the chain 37 to lock the endgate in lowered position. When the endgate is to be closed, the handle is pulled outwardly to disengage the plates 51 from the chains and is swung upwardly to closed position, the weight of the endgate being counterbalanced by the springs 42 in the cylinders 32 and 33. This closing movement is retarded by the air ahead of the piston 34 which slowly bleeds through the passageway 39 in a manner mentioned hereinabove. When in closed position the handle is moved to locking position with the plates 51 engaging the chains 37. When the handles are in locking position, the aperture 61 is in alignment with the aperture 62 and the hasp of the lock may be inserted through the apertures for preventing the unauthorized movement of the endgate 14.

What is claimed is:

1. An endgate for a vehicle body having hinged engagement with the bottom of the body, a box-section structure along the upper edge of the endgate to provide reinforcement therefor, a pair of air cylinders disposed within the box-section structure, each cylinder having one end closed and the other end open, the open ends being oppositely presented, a pair of pistons in said cylinders, rods secured to said pistons, link chains secured to the ends of the rods and projecting from the ends of the cylinders and the opposite ends of the box-section structure, springs about said rods for urging said pistons toward the closed ends of said cylinders, and means for securing in the chains to the sides of the vehicle body.

2. An endgate for a vehicle body having hinged engagement with the bottom of the body, a box-section structure along the upper edge of the endgate, a pair of air cylinders disposed within the box-section structure, each cylinder having one end closed and the other end open, the open ends being oppositely presented, a pair of pistons in said cylinders, rods secured to said pistons, link chains secured to the ends of the rods and projecting from the ends of the cylinders and the opposite ends of the box-section structure, springs for urging said pistons toward the closed ends of said cylinders, means for securing the chains to the sides of the vehicle body, and locking means within said box-section structure for engaging a link of said chains for locking the endgate in position.

3. An endgate for a vehicle body having hinged engagement with the bottom of the body, a box-section structure along the upper edge of the endgate, a pair of air cylinders disposed within the box-section structure, each cylinder having one end closed and the other end open, the open ends being oppositely presented, a pair of pistons in said cylinders, rods secured to said pistons, link chains secured to the ends of the rods and projecting from the ends of the cylinders and the opposite ends of the box-section structure, springs for urging said pistons toward the closed ends of said cylinders, means for securing the chains to the sides of the vehicle body, locking means within said box-section structure for engaging a link of said chains for locking the endgate in position, and rollers within said box-section structure near the ends thereof over which said chains are guided.

4. The combination with an endgate pivoted to the bottom of a vehicle body, a box-section structure along the top edge of said endgate to provide reinforcement therefor, a pair of air cylinders within said box-section structure, each cylinder having one end closed and the other end open, the open ends being oppositely presented, a piston within each cylinder near the closed end thereof in sealed relation thereto, a rod on each said piston, a chain on each said rod extending from said cylinders, a chain-guiding element in the open end of each said cylinder, a spring between each said chain-guiding element and cylinder piston, and means for securing the chains to the sides of the vehicle body.

5. The combination with an endgate pivoted to the bottom of a vehicle body, a box-section structure along the top edge of said endgate to provide reinforcement therefor, a pair of air cylinders within said box-section structure, each cylinder having one end closed and the other end open, the open ends being oppositely presented, a piston within each cylinder near the closed end thereof in sealed relation thereto, a rod on said piston, a chain-guiding element in the open end of each said cylinder, a spring between each said chain-guiding element and piston, a chain secured to the end of each of said rods extending through said guiding elements, and means for securing the ends of said chains to the opposite sides of said body.

6. The combination with an endgate pivoted to the bottom of a vehicle body, a box-section structure along the top edge of said endgate to provide reinforcement therefor, a pair of air cylinders within said box-section structure, each cylinder having one end closed and the other end open, the open ends being oppositely presented, a piston within each cylinder near the closed end thereof, a rod on said piston, a chain-guiding element in the open end of said cylinders, a spring between each said chain-guiding element and piston, a chain secured to the end of each of said rods extending through said guiding elements, and means for securing the ends of said chains to the opposite sides of said body, the closed end of said cylinders containing a passageway for the flow of air to and from the area between the pistons and the closed ends.

7. The combination with an endgate pivoted to the bottom of a vehicle body, a box-section structure along the top edge of said endgate to provide reinforcement therefor, a pair of air cylinders within said box-section structure, each cylinder having one end closed and the other end open, the open ends being oppositely presented, a piston within each cylinder near the closed end thereof, a rod on said piston, a chain-guiding element in the open end of said cylinders, a spring between each said chain-guiding element and piston, a chain secured to the end of each of said rods extending through said guiding elements, means for securing the ends of said chains to the opposite sides of said body, the closed end of said cylinders containing a passageway for the flow of air to and from the area between the pistons and the closed ends, and a valve for regulating the effective area of said passageway.

8. The combination with an endgate pivoted to the bottom of a vehicle body, a box-section structure along the top edge of said endgate, a pair of air cylinders within said box-section structure, each cylinder having one end closed and the other end open, the open ends being oppositely presented, a piston within each cylinder near the closed end thereof, a rod on said piston, a chain-guiding element in the open end of said cylinders, a spring between each said chain-guiding element and piston, a chain secured to the end of each of said rods extending through said guiding elements, means for securing the ends of said chains to the opposite sides of said body, additional chain-guiding elements secured in spaced relation to the ends of said guiding elements within the cylinder, and locking plates projectable in the spaces between said guide elements for engaging and securing the chain against movement.

9. The combination with an endgate pivoted to the bottom of a vehicle body, a box-section structure along the top edge of said endgate, a pair of air cylinders within said box-section structure, each cylinder having one end closed and the other end open, the open ends being oppositely presented, a piston within each cylinder near the closed end thereof, a rod on said piston, a chain-guiding element in the open end of said cylinders, a spring between each said chain-guiding element and piston, a chain secured to the end of each of said rods extending through said guiding elements, means for securing the ends of said chains to the opposite sides of said body, additional chain-guiding elements secured in spaced relation to the ends of said guiding elements within the cylinder, locking plates projectable in the spaces between said guide elements for engaging and securing the chain against movement, a shaft journaled in said box-section element, and a handle and a lever on said shaft to which said locking plates are pivoted in a position to be moved in said spaces between said guiding elements.

10. The combination with an endgate pivoted to the bottom of a vehicle body, a box-section structure along the top edge of said endgate, a pair of air cylinders within said box-section structure, each cylinder having one end closed and the other end open, the open ends being oppositely presented, a piston within each cylinder near the closed end thereof, a rod on said piston, a chain-guiding element in the open end of said cylinder, a spring between each said chain-guiding element and piston, a chain secured to the end of each of said rods extending through said guiding elements, means for securing the ends of said chains to the opposite sides of said body, additional chain-guiding elements secured in spaced relation to the ends of said guiding elements within the cylinder, locking plates projectable in the spaces between said guide elements for engaging and securing the chain against movement, a shaft journaled in said box-section element, a handle and a lever on said shaft to which said locking plates are pivoted in a position to be moved in said spaces between said guiding elements, a bracket secured to said endgate, and means by which the handle may be locked to said bracket when the locking plates are in chain-engaging position.

11. The combination with an endgate pivoted to the bottom of a vehicle body, a box-section structure along the top edge of said endgate to provide reinforcement therefor, a pair of air cylinders within said box-section structure, each cylinder having one end closed and the other end open, the open ends being oppositely presented, a piston within each cylinder near the closed end thereof in sealed relation thereto, a rod on each said piston, a chain-guiding element in the open end of each said cylinder, a chain secured to the end of each of said rods extending through said guiding elements, means for securing the ends of said chains to the opposite sides of said body, and rollers disposed in said box-section structure near the ends thereof over which said chains are guided.

12. The combination with an endgate pivoted to the bottom of a vehicle body, a box-section structure along the top edge of said endgate, a pair of air cylinders within said box-section structure, each cylinder having one end closed and the other end open, the open ends being oppositely presented, a piston within each cylinder near the closed end thereof, a rod on each said piston, a chain-guiding element in the open end of each said cylinder, a spring between each said chain-guiding element and cylinder piston, a chain secured to the end of each of said rods extending through said guiding elements, means for securing the ends of said chains to the opposite sides of said body, additional chain-guiding elements secured in spaced relation to the ends of said guiding elements within the cylinder, locking plates projectable in the spaces between said guide elements for engaging and securing the chain against movement, a shaft journaled in said box-section element, a handle and a lever on said shaft to which said locking plates are pivoted in a position to be moved in said spaces between said guiding elements, and spring means for urging said handle into chain-locking poston.

RUSSEL A. WELCH.

REFERENCES CITED

The following references are of record in the file of this patent:

UNITED STATES PATENTS

| Number | Name | Date |
|---|---|---|
| 141,896 | Shaw | Aug. 19, 1873 |
| 340,143 | Merredith | Apr. 20, 1886 |
| 370,468 | Griffing et al. | Sept. 27, 1887 |
| 2,205,823 | Rice | June 25, 1940 |
| 2,260,504 | Barrett | Oct. 28, 1941 |
| 2,328,082 | Lawrence | Aug. 31, 1943 |